(12) United States Patent
Pruitt et al.

(10) Patent No.: US 7,536,846 B1
(45) Date of Patent: May 26, 2009

(54) DEBRIS DIVERTER FOR A ROTARY CUTTER

(75) Inventors: Martin E. Pruitt, Hesston, KS (US); Brendon Nafziger, Canton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 12/140,986

(22) Filed: Jun. 17, 2008

(51) Int. Cl.
*A01D 34/00* (2006.01)
(52) U.S. Cl. ............................................. 56/13.6; 56/6
(58) Field of Classification Search .............. 56/6, 56/7, 12.3, 13.6, 255, 295
See application file for complete search history.

(56) References Cited

U.S. PATENT DOCUMENTS

| | | | |
|---|---|---|---|
| 4,468,916 A | 9/1984 | Vissers et al. | |
| 4,838,014 A * | 6/1989 | Koch et al. | 56/13.6 |
| 4,986,060 A | 1/1991 | Walters et al. | |
| 5,012,635 A | 5/1991 | Walters et al. | |
| 5,964,079 A | 10/1999 | Mellin et al. | |
| 5,996,323 A * | 12/1999 | Campbell et al. | 56/6 |

* cited by examiner

*Primary Examiner*—Robert E Pezzutto
(74) *Attorney, Agent, or Firm*—Hovey Williams LLP

(57) ABSTRACT

A rotary cutter assembly has a spindle journaled by a bearing assembly. A cutter mounting member is fixed to the spindle for rotation therewith and has an outermost annular skirt that flares radially outwardly and downwardly to a lowermost peripheral edge. The bearing housing that supports the bearing has an upstanding rib that surrounds the lower peripheral edge of the mounting member and projects upwardly beyond the same for a short distance. This overlapping relationship between the rib and the lower skirt periphery prevents the ingress of foreign materials into close proximity with the bearing assembly to thereby prolong its useful life.

8 Claims, 4 Drawing Sheets

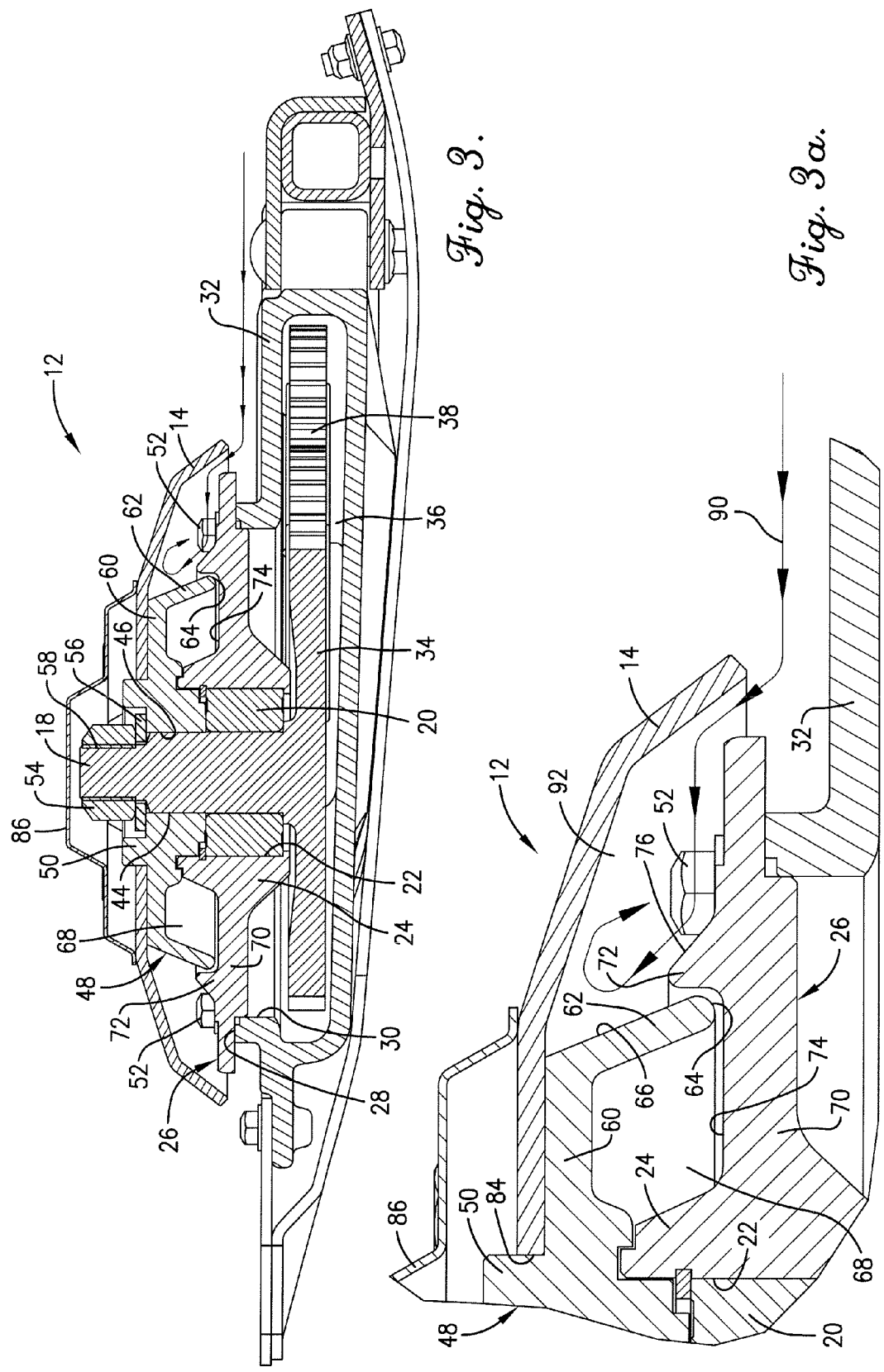

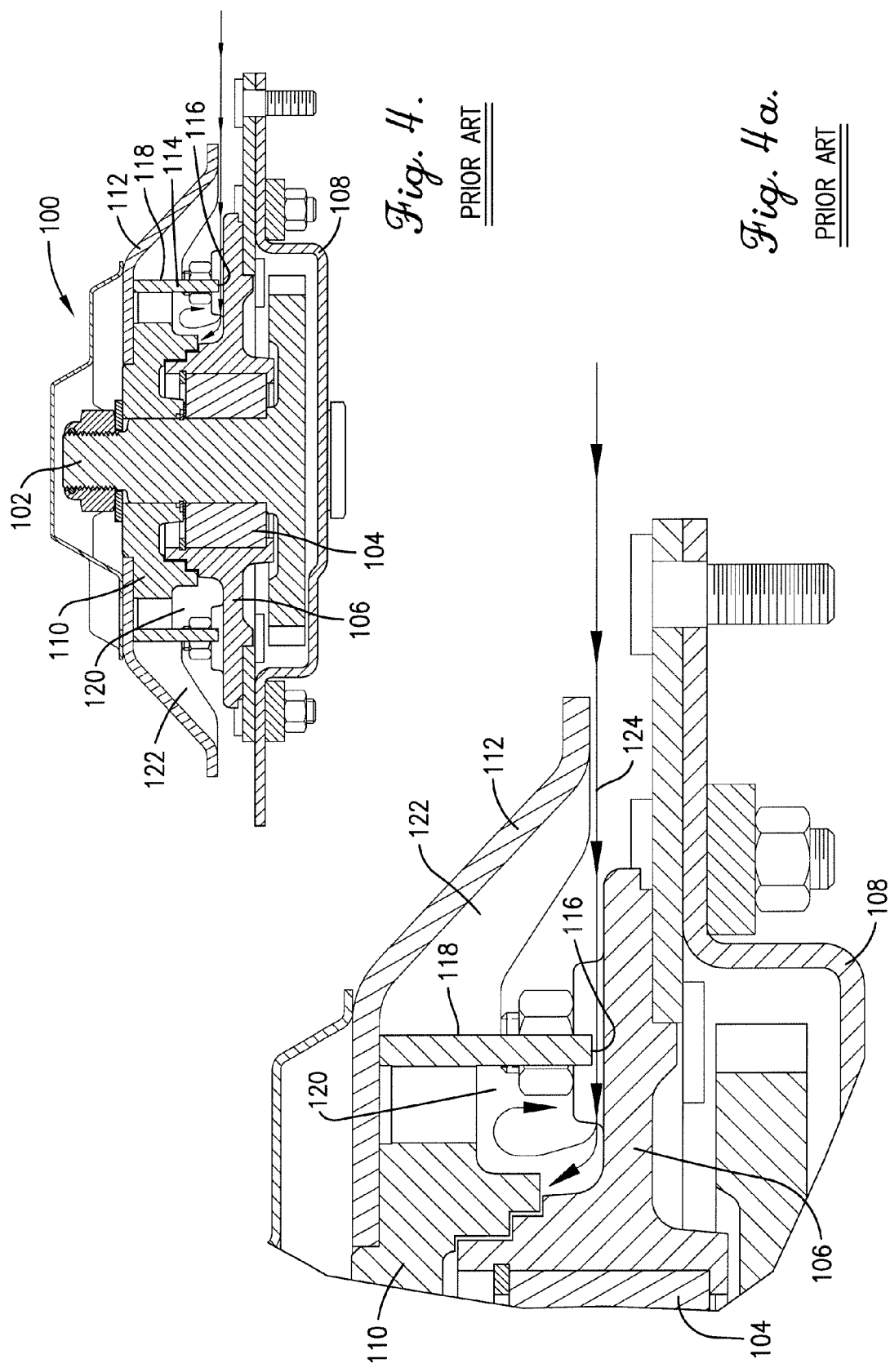

DEBRIS DIVERTER FOR A ROTARY CUTTER

TECHNICAL FIELD

The present invention relates to the field of rotary cutters such as the type used in farm equipment for mowing standing crop materials. More particularly, it relates to a way of inhibiting the migration of stringy materials and foreign matter deeply into the interior of such cutter assemblies where they can cause damage and premature component failure.

BACKGROUND AND SUMMARY

High speed rotary cutters are well known in the art. However, one nagging problem with such cutters is that foreign materials such as baling twine, wire or stringy crop materials can sometimes migrate into the bearing cavity of the cutters and wrap around the rotating spindle. This can cause damage to seals associated with the bearings and lead to premature bearing failure. Even if the materials do not reach the bearing cavity, they can still become wrapped tightly under the cutter mounting member of the assembly and build up to such a point that they generate an inordinate amount of heat, which can also result in premature bearing failure.

Accordingly, an important object of the present invention is to provide a rotary cutter assembly that inhibits the migration of deleterious materials into the immediate vicinity of the bearing assembly of the unit. It is also an important object of the invention to provide a cutter design that encourages foreign materials that would otherwise migrate to the center of the assembly to instead wrap around more exterior portions of the assembly in places less likely to cause damage and where they can be more easily removed.

BRIEF DESCRIPTION OF THE DRAWINGS

FIG. 3 is an enlarged, transverse cross-sectional view through one of the cutter assemblies taken substantially along line 3-3 of FIG. 1;

FIG. 3a is a further enlarged, fragmentary view of the assembly in FIG. 3 illustrating the manner in which a construction in accordance with the present invention inhibits the migration of foreign materials into the center of the assembly;

FIG. 4 is a transverse cross-sectional view of a prior art cutter assembly; and

FIG. 4a is an enlarged, fragmentary cross-sectional view of the prior art assembly of FIG. 4 illustrating the way in which foreign materials migrate into the center of the assembly.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
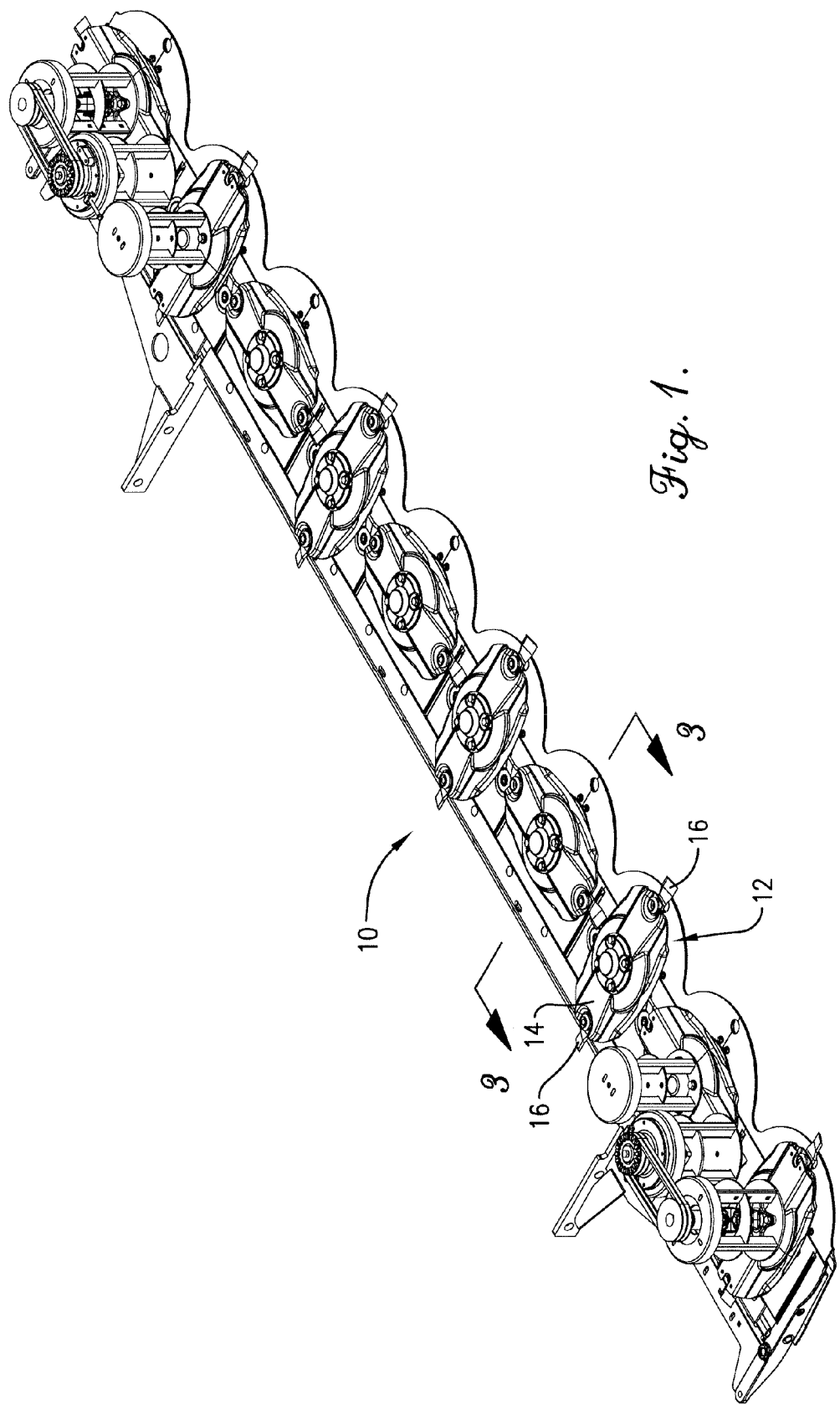
FIG. 1 is a top front isometric view of a rotary cutter bed of the type typically utilized in connection with windrowers, mower-conditioners and other mowing equipment and which may incorporate the principles of the present invention.

The rotary cutter bed 10 illustrated in FIG. 1 has a series of individual cutter assemblies 12 that are essentially identical to one another. Among other things, each assembly 12 includes an elliptical-shaped disc 14 that rotates at relatively high speeds about an upright axis and which carries a pair of flail-type cutter blades 16 at opposite ends thereof for impacting and severing standing crop materials as the disc rotates. Cutter assemblies 12 are timed relative to one another so that blades 16 of adjacent assemblies do not strike one another, even though their paths of travel overlap. In the illustrated embodiment, the two outboard assemblies 12 at opposite ends of bed 10 rotate in the same direction, i.e., generally toward the center of the cutter bed, while the six remaining inboard assemblies 12 rotate in mutually opposite directions, i.e., in oppositely rotating pairs. As will be seen, this arrangement can obviously be varied without impacting the principles of the present invention.

Figure 2:
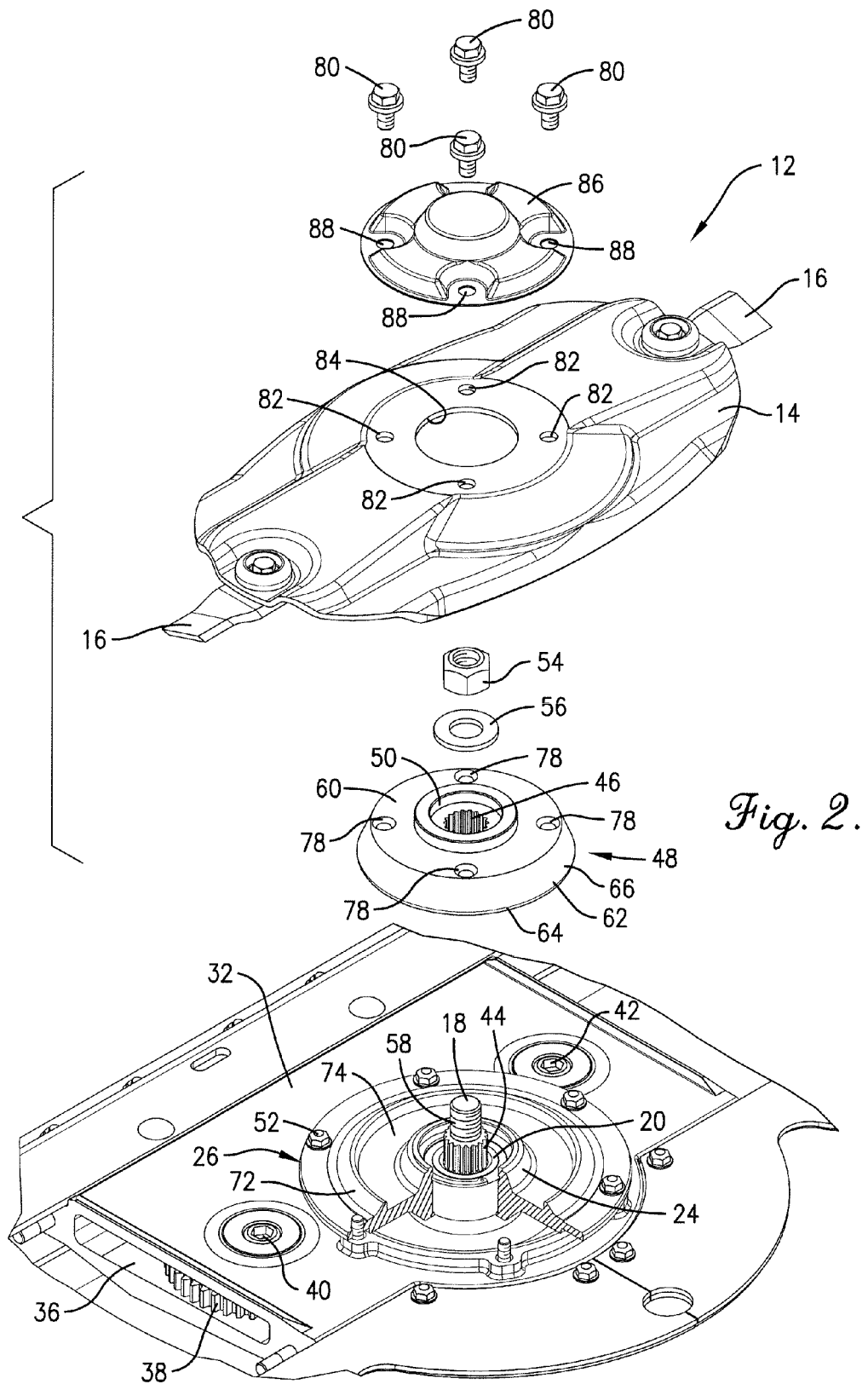
FIG. 2 is an enlarged, fragmentary, exploded isometric view of one of the rotary cutter assemblies of the cutter bed in FIG. 1, illustrating details of construction.

As illustrated particularly in FIGS. 2, 3 and 3a, each cutter assembly 12 further includes an upright, rotatable spindle 18 that defines the axis of rotation of disc 14. Spindle 18 is journaled by a bearing assembly 20 that is captured within an upright bore 22 in the central hub 24 of a stationary bearing housing 26. Bearing housing 26 rests upon an upwardly projecting rim 28 around a hole 30 in a generally flat, hollow gear case 32 of the cutter bed 10. In the illustrated embodiment, gear case 32 is comprised of a series of interconnected modules, but this construction can vary without affecting the principles of the present invention.

It will also be seen that in the illustrated embodiment, spindle 18 is driven by an integrally joined spur gear 34 within the open compartment 36 of gear case 32 below hole 30. Spur gear 34 has a pair of idlers 38 (only one being shown) engaged therewith on opposite sides of spindle 18 for the purpose of receiving driving power from an adjacent module and transferring it along the gear train to the next adjacent module. Numerous variations of this type of gear train may also be utilized without affecting the principles of the present invention including, for example, utilizing shafts and intermeshing bevel gears within gear case 32. The axes of rotation of idlers 38 are slightly behind spindle 18 and are represented in FIG. 2 by the hexagonal sockets 40 and 42 associated with bearing assemblies for the idlers 38.

As illustrated in FIG. 2 spindle 18 includes a splined portion 44 as illustrated in Fig. that mates with the internally splined bore 46 of a generally conical cutter mounting member 48 so that member 48 rotates with spindle 18. Mounting member 48 includes a central hub 50 through which bore 46 passes, the hub 50 being disposed in stacked relation to the hub 24 of bearing housing 26. Of course, member 48 rotates relative to bearing housing 26, which is secured to gear case 32 by a plurality of bolt assemblies 52 about the periphery of housing 26. A nut 54 and washer 56 on an uppermost externally threaded portion 58 of spindle 18 are utilized to secure mounting member 48 in place on spindle 18.

Projecting radially outwardly from hub 50 of mounting member 48 is a horizontal, annular, flat flange 60. At the radially outermost extremity of flange 60, an annular skirt 62 is affixed thereto and extends downwardly and outwardly therefrom. The outermost and lowermost extremity of skirt 62 defines a peripheral edge 64 of mounting member 48. Skirt 62 thus presents a radially outer face 66 of member 48 that slopes upwardly and inwardly from peripheral edge 64, giving member 48 its overall conical appearance as illustrated in FIG. 2. Due to the skirted construction of member 48, the underside of flange 60 and radially inside of skirt 62 define an annular void region 68 above bearing housing 26.

Bearing housing 26 also is provided with an annular, generally flat, horizontally extending flange 70 that projects outwardly from hub 24. In the top surface of flange 70, an upstanding, annular rib 72 is defined in surrounding relationship to the peripheral edge 64 of mounting member 48. Rib 72 projects upwardly beyond peripheral edge 64 and cooperates with the hub 24 to define a continuous, annular recess 74 in the top face of flange 70 that receives skirt edge 64. As illustrated particularly in FIG. 3a, rib 72 is generally triangular in cross-sectional configuration so as to present an outer, upwardly and inwardly sloping face 76. Thus, face 76 of rib 72 and face 66 of skirt 62 slope generally upwardly and inwardly in the same direction, although in the illustrated embodiment, face 76 of rib 72 has a slightly lower slope angle than face 66 of skirt 62 such that face 76 slopes generally toward face 66. In a most preferred embodiment of the invention, rib 72 is a continuous rib about the periphery of mounting member 48, although it is within the principles of the present invention to have such rib discontinuous as well.

The upper surface of flange 60 of mounting member 48 is provided with four drilled and tapped holes 78. Such holes 78 threadably receive four bolts 80 to detachably secure disc 14 to mounting member 48. Corresponding holes 82 in disc 14 register with holes 78 in mounting member 48 to allow the shanks of bolts 80 to pass through disc 14 and into threaded engagement with mounting member 48. A larger centrally disposed hole 84 in disc 14 receives the upper portion of hub 50 when disc 14 is in place on mounting member 48. A domed cap 86 may be fastened to disc 14 in overlying relationship to large hole 84 and the upper end of spindle 18 and nut 54 for covering such structures. Cap 86 is provided with four bolt holes 88 that align with holes 78 and 82 so that bolts 80 may be utilized to secure cap 86 in place.

As illustrated especially in FIG. 3a, when disc 14 is rotating at high speeds, stringy crop materials, twine and other foreign matter can slip beneath disc 14 as illustrated by the arrow 90 into an outer annular void region 92 defined between the underside of disc 14, the top of bearing housing 26 outboard of mounting member 48, and skirt 66 of mounting member 48. However, once the materials are within the outer void region 92, they can travel no further into the interior of the cutter assembly due to the barriers presented by rib 72 and skirt 62. Although the materials can wrap around skirt 62, such materials tend to migrate toward the portion of least diameter of skirt 62, i.e., the top of skirt 62 adjacent flange 60, rather than work their way down and under peripheral edge 64 into the inner void region 68 closer to bearing assembly 20. There is no relative rotation between mounting member 48 and disc 14; thus, materials that accumulate up in the "corner" between member 48 and disc 14 are not subjected to friction and heat buildup from high speed, relatively moving surfaces. This keeps bearing assembly 20 protected against the abrasive effects of the wrapping materials and prevents the buildup of excessive heat within interior void region 68 which might otherwise adversely affect the useful life of bearing assembly 20.

In the event it becomes necessary or desirable to remove accumulating materials from within the outer void region 92, this can be readily accomplished by simply removing bolts 80, pulling off cap 86 and discs 14, and removing the accumulated materials from around the outside of mounting member 48. Thereafter, disc 14 and cover 86 are quickly and easily reinstalled and bolts 80 are tightened down to return the components to their normal operating conditions.

Note that it is not necessary to remove mounting member 48 because materials should not be accumulating within the inner void region 68. Thus, there is no need to loosen and remove the main nut 54 on spindle 18 and lift off mounting member 48. This is a great time-saver and also avoids the risk of failing to re-establish proper timing relationship in the cutter assembly when mounting member 48 is replaced on spindle 18 and nut 54 is tightened down.

FIGS. 4 and 4a illustrate a prior art construction which allows debris and other foreign materials to enter deeply into the cutter assembly and cause damage to the bearing assembly or premature failure thereof. In these views, the prior art cutter assembly is designated by the numeral 100 and includes many of the same components as cutter assembly 12, but in different configurations. For example, in prior art cutter assembly 100, the spindle 102 is journaled by a bearing assembly 104 that is in turn retained by a bearing housing 106 secured to the gear case 108. A cutter mounting member 110 is secured to spindle 102 for rotation therewith relative to bearing housing 106, and a disc 112 is secured to mounting member 110 for rotation therewith.

Mounting member 110 has a radially outermost, downwardly projecting, annular skirt 114 that presents a lowermost peripheral edge 116 spaced only a short distance above bearing housing 106 so as to provide running clearance. Skirt 114 has a vertical, non-tapering outer face 118. An inner annular void region 120 is defined above the flange of bearing housing 106 and inboard of skirt 114, while an outer annual void region 122 is defined under the outer portion of disc 112 and outboard of skirt 118 above bearing housing flange 106.

In this prior art cutter assembly 100, foreign materials can slip under discs 112 as illustrated by the arrow 124. Instead of remaining in the outer void region 122, however, such materials have a tendency to work their way under the peripheral edge 116 of skirt 118 and into the more sensitive inner void region 120. Once within inner void region 120, the materials can work their way through the interface between mounting member 110 and the hub of bearing housing 106 to enter the bearing cavity where the bearing assembly 104 is located. Once in that region, the materials can destroy the seal the bearing assembly, allowing the grease to escape and causing the bearing to fail in that manner. Even if the materials do not fully find their way into the bearing cavity, their build-up within inner void region 120 can result in the generation of excessive heat in that area caused by the frictional interengagement of rotating mounting member 110 and the trapped foreign matter, leading to premature bearing failure for that reason. This bearing failure then necessitates complete disassembly and rework of the cutter assembly. This is a very undesirable and frustrating circumstance, also causing significant loss of time during the repair and rebuild operations.

However, with the present invention as noted earlier, the foreign materials have no opportunity to enter the inner void region 68. Instead, the most that can happen is that they are guided upwardly by the sloping outer face 66 of mounting member 48 to migrate toward the top corner of the outer void region 92, where they accumulate beneath the underside of disc 14. Such materials can then be quickly and easily removed by simply pulling off the disc 14 and removing the materials.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a rotary cutter assembly having an upright, rotatable spindle, the improvement comprising:

a stationary bearing housing having an upright bore;

a bearing assembly disposed within said bore and journaling said spindle for rotation about an upright axis; and a cutter mounting member secured to said spindle above the housing for rotation with the spindle relative to said housing, said cutter mounting member having a radially outwardly disposed lower peripheral edge, said housing having an annular rib surrounding said lower peripheral edge of the cutter mounting member and projecting upwardly beyond said lower peripheral edge of the cutter mounting member to inhibit the migration of foreign materials into the bearing assembly from the exterior of the cutter assembly.

2. In a rotary cutter assembly as claimed in claim 1, said rib being circumferentially continuous.

3. In a rotary cutter assembly as claimed in claim 1, said mounting member having a radially outer face that slopes upwardly and inwardly from said lower peripheral edge.

4. In a rotary cutter assembly as claimed in claim 3, said rib having an upwardly and inwardly sloping radially outer face.

5. In a rotary cutter assembly as claimed in claim 4, said outer face of the rib sloping upwardly toward said outer face of the mounting member.

6. In a rotary cutter assembly as claimed in claim 3, said mounting member having a radially outwardly and downwardly projecting, annular skirt, said outer face and said lower peripheral edge of the mounting member being on said skirt.

7. In a rotary cutter assembly as claimed in claim 6, said housing including a central hub having an upper end, said hub and said rib cooperating to define an annular recess below said upper end of the hub and within which said lower peripheral edge of the skirt rotates.

8. In a rotary cutter assembly as claimed in claim 7, said rib being circumferentially continuous.

\* \* \* \* \*